United States Patent [19]
Uchino

[11] Patent Number: 5,355,448
[45] Date of Patent: Oct. 11, 1994

[54] METHOD OF GENERATING DOT SIGNALS CORRESPONDING TO CHARACTER PATTERN AND THE SYSTEM THEREFOR

[75] Inventor: Atsushi Uchino, Suwa, Japan

[73] Assignee: Seiko Epson Corporation, Tokyo, Japan

[21] Appl. No.: 768,878

[22] PCT Filed: Feb. 27, 1991

[86] PCT No.: PCT/JP91/00261
§ 371 Date: Dec. 27, 1991
§ 102(e) Date: Dec. 27, 1991

[87] PCT Pub. No.: WO91/13427
PCT Pub. Date: Sep. 5, 1991

[30] Foreign Application Priority Data
Feb. 27, 1990 [JP] Japan .................... 2-46362

[51] Int. Cl.$^5$ ............................ G06F 15/62
[52] U.S. Cl. .................... 395/150; 364/926.7; 364/DIG. 2; 345/26; 345/144
[58] Field of Search ............ 395/150, 151, 143; 340/730, 732, 750, 751, 799; 345/144, 26, 141, 192, 194

[56] References Cited
U.S. PATENT DOCUMENTS

| | | | |
|---|---|---|---|
| 4,199,815 | 4/1980 | Kyte et al. | 364/523 |
| 4,675,830 | 6/1987 | Hawkins | 364/518 |
| 4,967,376 | 10/1990 | Katsura | 364/521 |
| 5,113,491 | 5/1992 | Yamazaki | 395/141 |
| 5,148,519 | 9/1992 | Ishii | 395/141 |

FOREIGN PATENT DOCUMENTS 293698 12/1988 European Pat. Off. .
59-188761 10/1984 Japan .
1-191192 8/1989 Japan .

OTHER PUBLICATIONS

EPO Patent Abstracts of Japan, JP11091192, vol. 13, NO. 480, Oct. 1989.

Primary Examiner—Heather R. Herndon
Assistant Examiner—Joe Feild
Attorney, Agent, or Firm—Ladas & Parry

[57] ABSTRACT

The system for generating dot signals corresponding to a character pattern on the basis of outline information of a character pattern described by only straight lines comprises a section 6 for deciding end points of straight lines constituting outlines on the basis of the outline information. In response to end point information decided by this section 6, a DDA calculating section 7 continuously generates information indicative of a pair of points constituting two straight lines, respectively in such a way that two straight lines can be extended from one end point selected from the decided end points toward two end points adjacent thereto. The generated information indicative of a pair of points is inputted to a straight line generating section 8 for generating a straight line composed of dot signals between a pair of the points. These dot signals correspond to a character pattern. As described above, dot signals corresponding to a character pattern can be obtained directly from outline information described by only straight lines.

3 Claims, 8 Drawing Sheets

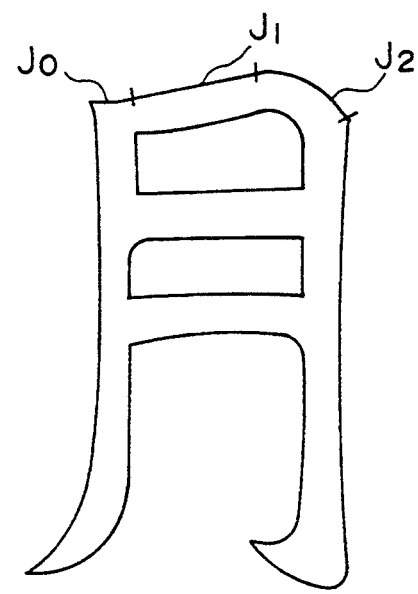
FIG. 1
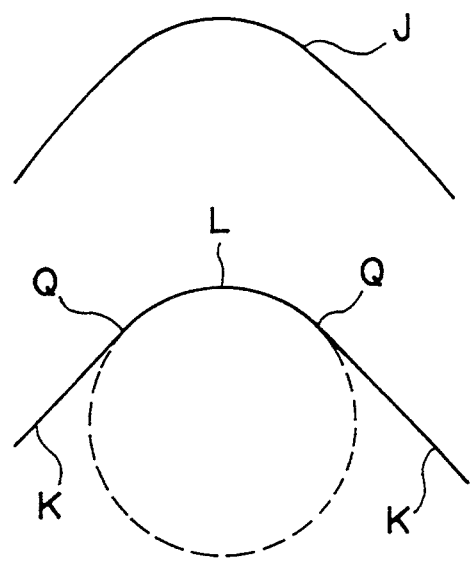
FIG. 2A
FIG. 2B
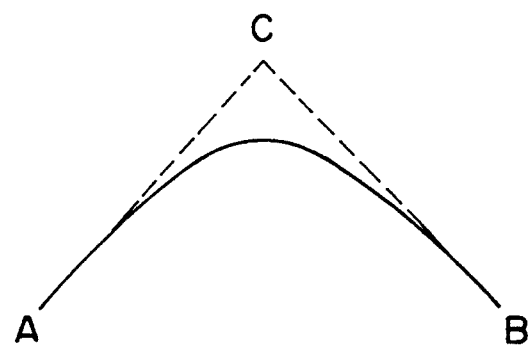
FIG. 2C

METHOD OF GENERATING DOT SIGNALS CORRESPONDING TO CHARACTER PATTERN AND THE SYSTEM THEREFOR

TECHNICAL FIELD

The present invention relates to a method and a system for generating dot patterns on the basis of so-called outline font data for determining character pattern outlines.

BACKGROUND ART

With advance of higher reliability of print output in word processors, for instance, the number of dots which constitute a character pattern has been increased rapidly. Therefore, there arises a problem in that the capacity of a character generator memory for storing characters as dot pattern data increases more and more.

To overcome the problem as described above, a so-called outline font method has been proposed such that the outline of a character pattern is divided into a plurality of areas j0, j1, j2, . . . as shown in FIG. 1, for instance; the start and end point coordinates of these areas j0, j1, j2 . . . are previously stored as data; and the divided outlines are interpolated on the basis of dot signals before output.

In this method, since not only high reliable characters of many dots can be outputted in spite of a relatively small amount of data to be stored, but also the character sizes can be expanded and contracted by coordinate calculation, there exists an advantage of coping with characters of various sizes.

However, since the outline information as described above can be obtained by approximating a curve J for forming a character outline as shown in FIG. 2A on the basis of straight lines K, K and a circular arc L as shown in FIG. 2B, when the curve is required to be approximated precisely in particular, there exists a problem in that a great number of circular arcs of different radii must be stored so that the memory capacity inevitably increases.

To overcome the above-mentioned problem, there has been proposed another method of approximating the character outline by use of Conic-spline or Bezier function which can determine a curve on the basis of three points of start and end points A and B of a curve representing an outline and a control point C indicative of an intersection of two tangent lines described at these points A and B as shown in FIG. 2C. When the Conic-spline or Bezier function is adopted, it is possible to approximate the character outline by a smooth curve in spite of a relatively small memory capacity.

In the prior-art character pattern signal generating systems, however, dot signals corresponding to a character pattern are generated through complicated processing such as conversion into outline information described by only straight lines, conversion into outline data composed of dot signals on dot coordinates, etc. Therefore, there exists a problem in that a great amount of memory capacity is required, because the outline information composed of dot signals must be temporarily stored in some memory medium in the process of forming the outline information composed of dot signals on the basis of outline data described by an approximate function and the process of forming dot signals corresponding to the character pattern on the basis of the outline information composed of dot signals.

DISCLOSURE OF THE INVENTION

The object of the present invention is to reduce the memory capacity required to store the outline information composed of dot signals by directly forming dot signals corresponding to the character pattern on the basis of outline information described by only straight lines.

In the method according to the present invention, one end point of the outline information described by only straight lines is noticed; two straight lines composed of dot signals are extended toward two end points adjacent to the afore-mentioned noticeable end point. In this extension process, a pair of points are generated sequentially at the extreme points of the two straight lines to extend these straight lines, respectively. Whenever a pair of the points are generated, a straight line composed of dot signals is generated between a pair of the points. The abovementioned processing is repeated until the straight line extending between a pair of the points reaches the two adjacent end points. As described above, dot signals corresponding to a character pattern can be formed directly on the basis of the outline information described by only straight lines. Therefore, since it is unnecessary to temporarily store the outline information composed of dot signals, the memory capacity can be reduced markedly.

BRIEF DESCRIPTION OF THE DRAWINGS

FIGS. 1, 2A, 2B and 2C are illustrations for assistance in explaining prior-art method of forming character outline information;

THE BEST MODE OF EMBODYING THE INVENTION

With reference to FIGS. 3 to 6, an embodiment of the character pattern generating method according to the present invention will be described hereinbelow.

Figure 3:
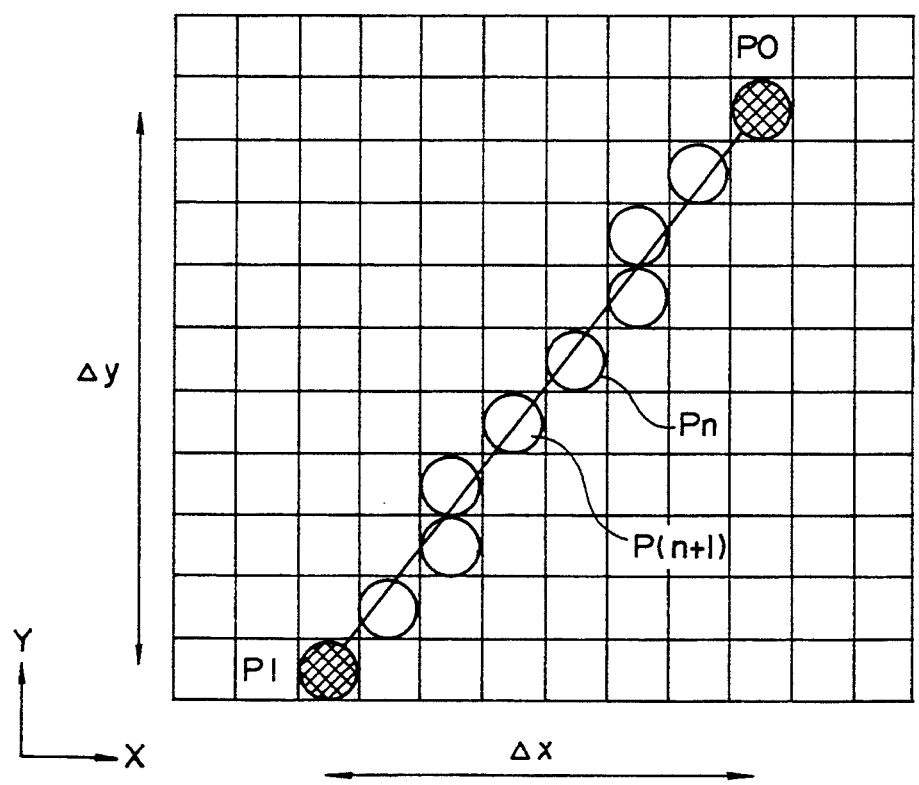
FIGS. 3, 4, 5 and 6 are illustrations for assistance in explaining the dot signal generating method according to the present invention.

FIG. 3 shows a processing of extending a straight line from an end point p0 toward an end point p1 on dot coordinates. Assuming that the straight line has been extended to a point pn (coordinates: pxn, pyn), a point p(n+1) (coordinates: p(n+1)x, p(n+1)y) to be generated next can be obtained by the following formulae:

When the horizontal and vertical distance components between the two end points p0 and p1 are denoted as $\Delta x$, $\Delta y$, respectively, if $0 \leq \Delta x \leq \Delta y$, $$e(n + 1) = en + \frac{\Delta x}{\Delta y}$$

$$px(n + 1) = pxn - 1$$
$$e(n + 1) - 0.5 \geq 0,$$
$$py(n + 1) = pyn - 1, en = en - 1$$
$$e(n + 1) - 0.5 < 0$$
$$py(n + 1) = pyn$$

This method is an interpolation method known as DDA (Digital Differential Analyser).

In the present invention, dot signals corresponding to a character pattern can be generated by utilizing the DDA method as follows:

Process A

Figure 4:
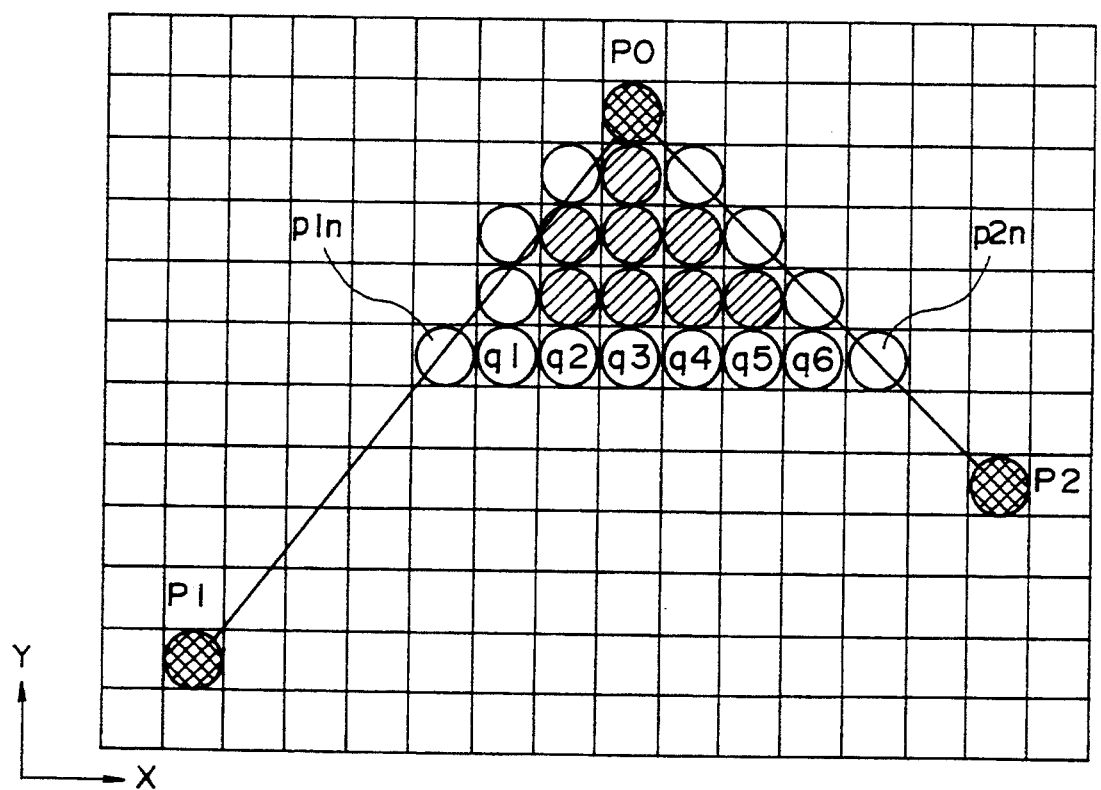

In FIG. 4, any given end point p0 on the outline information described by only straight lines is noticed.

Process B

Two straight lines are simultaneously extended from this noticeable end point p0 toward two end points p1 and p2, respectively by simultaneously executing the ADD method between the noticeable end point p0 on the outline information described by only straight lines and two end points p1 and p2 adjacent to this noticeable end point p0.

Process C

The assumption is made that a pair of points p1n and p2n interpolated at the n-th time beginning from the end point p0, for instance during the execution of this DDA method are obtained simultaneously. At this time, a point string q1, q2, q3, q4, . . . which constitute a straight line between the two interpolated points p1n and p2n can be obtained by executing the DDA method between a pair of the interpolated points. This point string represents dot signals corresponding to a character pattern.

By repeating the above processes B and C, dot signals within a triangular area determined by three end points p0, p1 and p2 can be obtained.

Process D

Figure 5:
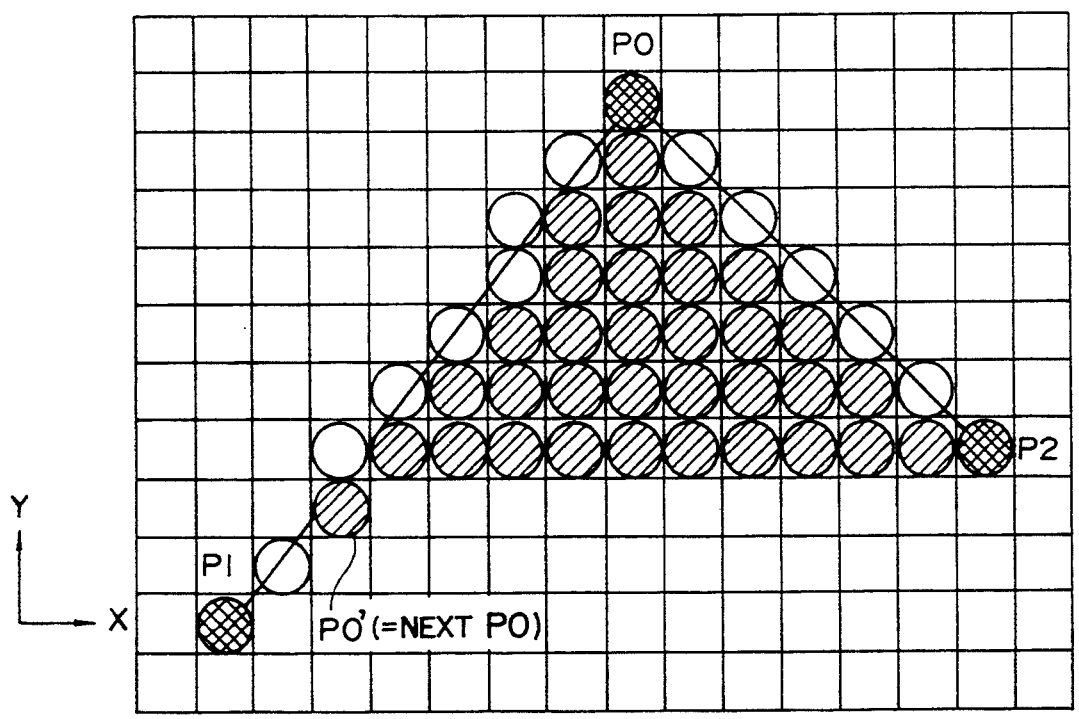

As shown in FIG. 5, when the execution reaches either one of the end points p1 and p2 in the above process B, a subsequent point p0' generated on the side where the execution does not yet reach the end is determined as the subsequent noticeable end point p0 on the outline information described by only straight lines. In the same manner outline pattern dot signals are generated and pattern fill dot signals are generated in the space between the outline pattern dot signals repeatedly until either both on the outline pattern dot signals meet at a final end point or both of the outline pattern dot signals arrive at their respective target end points simultaneously, at which time patter fill dot signal generation continues until the character pattern is complete.

Figure 6:
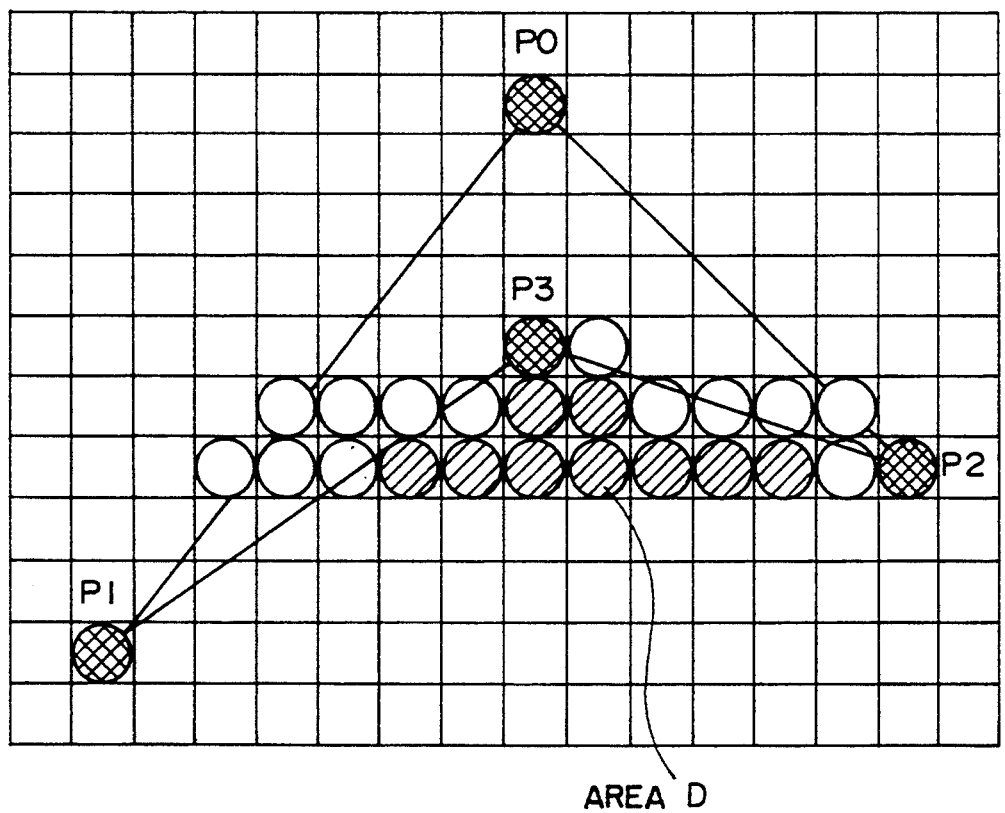

Further, when the character pattern is being formed on the basis of the outline information in the above process, a problem may arise when the outline information is recessed in the form as shown in FIG. 6. In other words, there exists a possibility that dot signals are erroneously generated in an area D outside the recessed outline. To overcome this problem, the newly formed dot signals and already formed character pattern are NANDed in the dot signal generating process. That is, the dot signals within the area D which are erroneously generated by the processing on the basis of the noticeable end point p0 in FIG. 6 and the dot signals generated by the succeeding processing on the basis of the noticeable end point p3 are NANDed to cancel the dot signals within the area D.

Figure 7:
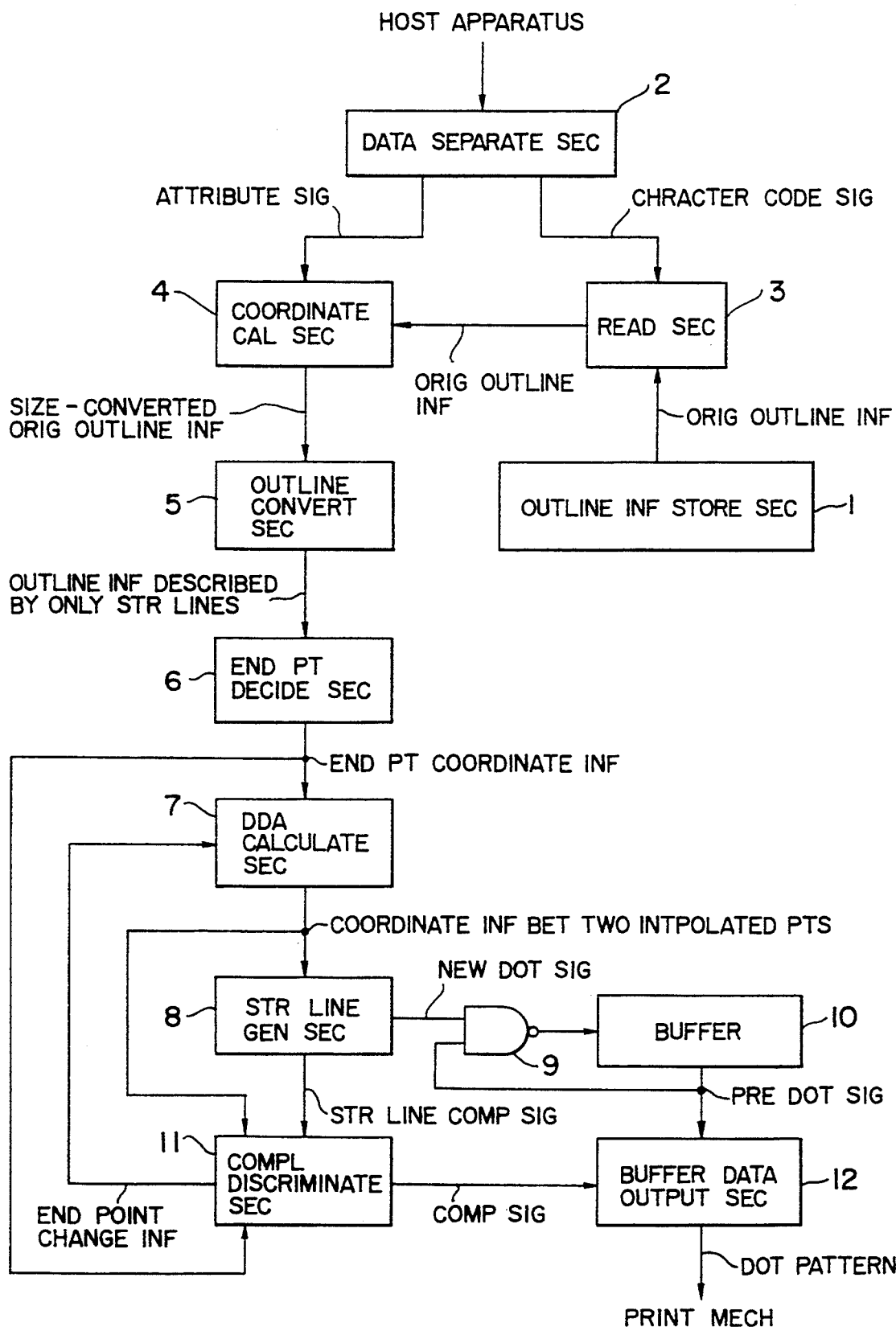
FIG. 7 is a block diagram showing an embodiment of the dot signal generating system according to the present invention.

An embodiment of the system for embodying the method according to the present invention is shown in FIG. 7 An outline information storing section 1 previously stores the outline information described by only straight lines or by approximated curves determined by the Conic-spline function or Bezier function, etc.

A data separating section 2 separates signals transmitted from a host apparatus (not shown) into a character code signal and an attribute signal representative of a character size, respectively. The character code signal is outputted to a reading section 3, and the attribute signal is outputted to a coordinate calculating section 4.

The reading reaction 3 reads the outline information of characters corresponding to the received character code signal from the storing section 1, and transmits the read outline information to the coordinate calculating section 4. The outline information read from the storing section 1 is referred to as the original outline information, hereinafter.

The coordinate calculating section 4 converts the size of the original outline information read from the storing section 1 into a character size designated by the host apparatus on the coordinates, and transmits the converted size to an outline converting section 5.

The outline converting section 5 reproduces Conic-spline curves or Bezier curves on the basis of start point coordinates, end point coordinates, and control point coordinates included in the original outline information when the inputted original outline information is described by approximation curves based upon the Conic-spline function or Bezier function; approximates these curves by straight lines, and outputs character outline information described by only straight lines to an end point deciding section 6.

The end point deciding section 6 decides end points of the respective straight lines constituting outlines on the basis of the outline information described by only straight lines, and transmits coordinate information at the respective end point to a DDA calculating section 7 and a complete discriminating section 11.

The DDA calculating section 7 notices one of end points input thereto, extends two straight lines from the noticeable end point toward two adjacent end points, and forms a pair of interpolated points at the extreme ends of the two straight lines, respectively in accordance with the DDA method, as already explained with reference to FIGS. 3 and 4. The coordinate information of a pair of the formed interpolated points are given to a straight line generating section 8 and the complete discriminating section 11.

The straight line generating section 8 forms a straight line composed of dot signals between a pair of interpolated points inputted in accordance with the DDA method, as already described with reference to FIG. 4. The dot signals of this formed straight line are inputted to a NAND gate 9, and NANDed together with the already formed dot signals read from a buffer 10 at the corresponding coordinates. The NANDed results of these dot signals are written in the buffer 10. Further, since the buffer 10 is originally blanked, although a straight line formed by the straight line generating section 8 is written as it is in the buffer 10, when a straight line is generated erroneously at the recessed portion, this straight line is blanked through the NAND processing as already described with reference to FIG. 6. Whenever a straight line has been generated between a pair of interpolated points, the straight line generating section 8 transmits straight line complete information to the complete discriminating section 11.

The complete discriminating section 11 discriminates whether the straight line formed by the DDA calculating section 7 reaches either one of end points adjacent to the noticeable end point on the basis of the coordinate information at the interpolated points inputted from the DDA calculating section 7, and transmits end point change information to the DDA calculating section 7 when having recognized its arrival to one end point. In response to the end point change information, the DDA calculating section 7 changes a noticeable end point and extends two straight lines from a newly noticed end point toward the adjacent end points as already described with reference to FIG. 5. The complete discriminating section 11 further discriminates whether the formation of all the straight lines constituting character outlines have been completed by the DDA calculating section 7, and transmits a complete signal to a buffer data output section 12, at the time when the completion has been recognized and the final straight line between two interpolated points (generated at the completion time point) has been formed by the straight line generating section 8.

In response to the complete signal, the buffer data output section 12 reads the dot pattern from the buffer 10 and transmits it to a printing mechanism not shown.

Figure 8:
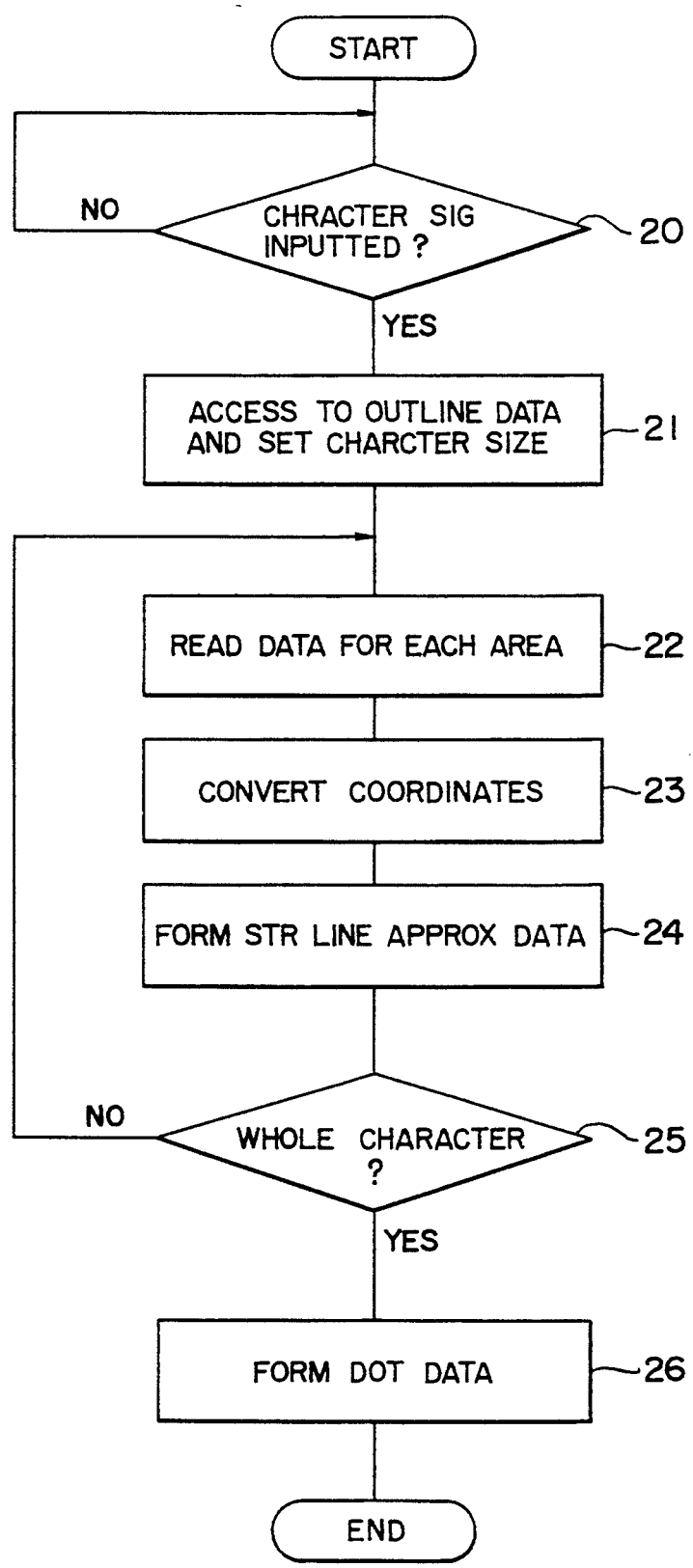
FIGS. 8 and 9 are flowcharts for assistance in explaining the operation of the embodiment shown in FIG. 7.

The operation of the system thus constructed will be described with reference to a flowchart shown in FIG. 8. As the preparation stage, each of all the necessary characters is divided into a plurality of areas suitable for approximating the outlines of each character pattern into straight lines, the Conic-spline function or Bezier function, and further the respective start, end and control points are determined for each area. The original outline information of each character thus obtained is previously stored in the outline data storing section 1 with character codes as addresses.

Under the conditions that the above-mentioned preparation stage has been completed, if a character signal is inputted from a host apparatus (not shown) (in step 20), the character signal is separated into the character code signal and the attribute signal by the data separating section 2. The separated character code signal has access to the outline data storing section 1 via the reading section 3, and the separated attribute signal is inputted to the coordinate calculating section 4 to set the character size (in step 21).

At the stage where the ready to read has been completed, the reading section 3 reads the original outline information corresponding to each character for each area where the outline is formed (in step 22).

The coordinate calculating section 4 converts the coordinates of start, end and control points which constitute the original outline information read from the reading section 3 into coordinates corresponding to the magnitude of the character size designated by the attribute signal (in step 23), and outputs the converted coordinates to the outline converting section 5. The outline converting section 5 calculates the Conic-spline function or Bezier function corresponding to the inputted coordinates, approximates and divides the functions into straight lines, and outputs the straight lines to the end point deciding section 6 (in step 24). As described above, after the outline information by which the whole of one character is described by only straight lines has been formed (in step 25), the end point deciding section 6 and other sections 7 and after convert the outline information into dot pattern signals (in step 26).

Figure 9:
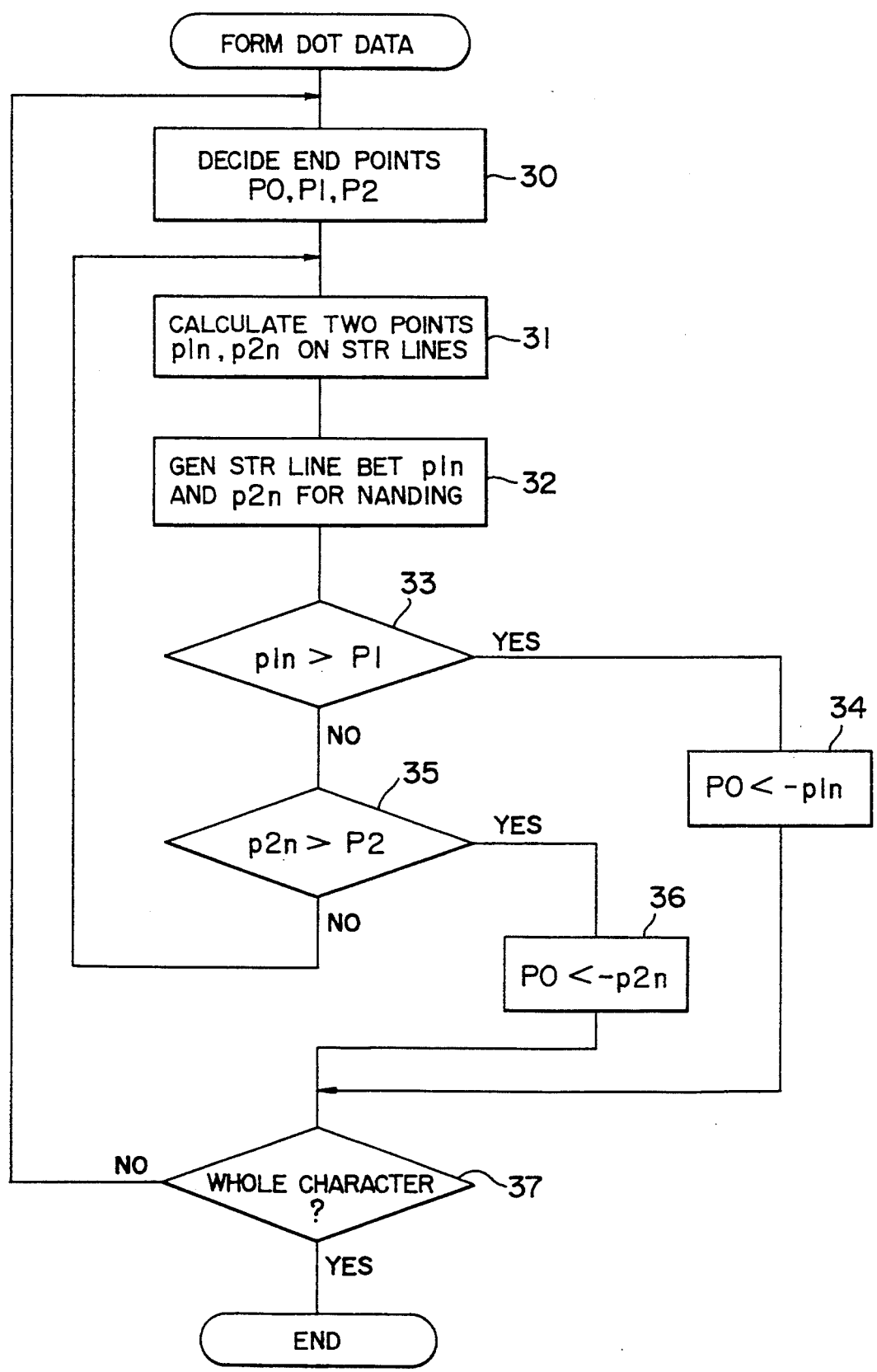

The detailed procedure of the step 26 is shown in FIG. 9. The end point deciding section 6 decides end points of the respective straight lines which constitute the character outlines, and the DDA calculating section 7 takes any given end point p0 and a pair of two end points p1 and p2 adjacent to the end point p0 (in step 30) and extends two straight lines from the noticeable end point p0 toward the two end points p1 and p2 (in step 32). At the same time as the straight line extension execution, the straight line generating section 8 generates a straight line composed of dots between two interpolated points p1n and p2n at the extreme ends of the two extension lines and further executes NAND calculation of these straight lines (in step 32). The discriminating section 11 discriminates whether the extreme ends p1n and p2n of the extension lines reach the end points p1 and p2. If either of the extreme ends p1n and p2n of the straight lines reaches the end point p1 or p2 (in step 33 or 35), an extreme end point of a straight line which does not reach the end point is determined as the subsequent noticeable end point p0 (in step 34 or 36).

The above procedure is executed for all the outline information to generate dot signals corresponding to the character pattern (in step 37).

As described above, it is possible to directly obtain dot signals indicative of the character pattern on the basis of outline information described by only straight lines.

Without being limited to the above-mentioned embodiment, the present invention can be embodied in various modifications.

I claim:

1. A method of generating dot signals for character patterns having smooth outlines, comprising the steps of:
   determining a plurality of end points from original outline data;
   selecting one end point from said plurality of end points;
   successively generating dot signals progressing from said end point outline pattern one dot at a time towards each of two adjacent end points to generate two intersecting lines having space therebetween;
   generating pattern fill dot signals to fill the space between said outline pattern dot signals;
   generating outline pattern dot signal progressing towards a closest adjacent end point when either of said outline pattern dot signals, which said outline pattern dot signals are generated simultaneously, reaches a target end point;
   generating pattern fill dot signals in the space between the outline pattern dot signal generated progressing towards a closest adjacent end point and another outline pattern dot signal; and
   generating a sequence of outline pattern dot signals in the space between said outline dot signals until either both of the outline pattern dot signals meet at a final end point or both of the outline pattern dot signals arrive at their respective target end points simultaneously, followed by continued pattern fill dot signal generation until the character pattern is complete.

2. An apparatus for generating dot signals, for character patterns having smooth outlines, comprising:
   means for determining a plurality of end points from original outline data;
   means for successively generating dot signals progressing from an end point outline pattern one dot at a time towards each of two adjacent end points to generate two intersecting lines having space therebetween;
   means for generating pattern fill dot signals to fill the space between said outline pattern dot signals; and
   means for generating outline pattern dot signal progressing towards a closest adjacent end point when either of said outline pattern dot signals, which said outline pattern dot signals are generated simultaneously, reaches a target end point, thereby to generate pattern fill dot signals in the space between the outline pattern dot signal generated toward the next adjacent end point and the other outline pattern dot signal; and then to generate outline pattern dot signals in the space between said outline dot signals repeatedly until either both of the outline pattern dot signals meet a final end point or both of the outline pattern dot signals arrive at their respective target end points simultaneously, followed by continued pattern fill dot signal generation until the character patter is complete.

3. An apparatus of claim 2 further comprising:

means for storing a portion of dots of a character pattern obtained by said means for generating pattern fill dot signals and means for generating outline pattern dot signal; and means for performing a NAND operation;

thereby to perform a logic operation between dots stored in said means for storing a portion of dots representing a character so as to remove dots not required to obtain a predetermined character pattern.

* * * * *